Patented July 10, 1951

2,560,299

UNITED STATES PATENT OFFICE 2,560,299

SYNTHETIC RESIN AND PROCESS OF MAKING SAME

Thomas Robert McElhinney, Lockport, La., assignor to Valite Corporation, New Orleans, La., a corporation of Louisiana No Drawing. Application April 8, 1949, Serial No. 86,380

1 Claim. (Cl. 260—17.2)

This invention relates to the process of making a water-soluble, heat-hardenable synthetic resin. More specifically, it relates to a process of preparing a water-soluble heat-hardenable impregnating resin from a non-water-soluble, non-heat-hardenable resin prepared from a phenol and bagasse according to the method described in my United States Patent No. 2,394,000, the disclosure of which patent is hereby incorporated in and made a part of this application.

The object of the invention is the production of a water solution of heat-hardenable resin produced from a phenol, e. g., phenol, cresol, etc. and bagasse or other ligno-cellulose material which can be used for the impregnation and subsequent lamination of paper, cloth, glass fabrics, and other filler materials commonly used for the production of high strength laminated articles.

The basic phenol-bagasse resin used in the preparation of this water-soluble resin is prepared by a process similar to that described in Example I of United States Patent No. 2,394,000.

Example I

About one thousand parts by weight of dry bagasse and about twelve hundred parts of phenol in which about forty parts of concentrated sulfuric acid has been reacted and melted are placed in a rotating digester and digested with live steam at about two hundred pounds (200) per square inch pressure for about two hours. The digester is then blown down and the contents dumped into a suitable receiver. The product, a shiny, black, non-heat-hardenable, water-insoluble resin, is agitated and washed with water. The wash water, cook liquor and blow-down condensate are combined and saved for subsequent recovery of phenol, organic acids, and other products formed as by-products of the reaction. The resin is dried by heating to about two hundred thirty degrees Fahrenheit (230° F.) with continuous agitation. The final product is a lustrous black resin, insoluble in water but completely soluble in acetone, alcohol and other resin solvents, hard at room temperature and incapable of being permanently hardened even with prolonged heating.

For the preparation of the water-soluble, heat-hardenable resin in accordance with this invention, the following typical example is given:

Example II

About one hundred parts by weight of the product of Example I, about ten parts sodium hydroxide, and about sixty parts of water are heated together with agitation until the resin has melted and dissolved. About one hundred parts of 37% formaldehyde solution is added and the solution allowed to come to boiling. About forty parts of water and about thirty parts of denatured alcohol are added immediately to stop the reaction. The resulting solution contains from about 35% to 40% active solids as it is discharged from the reaction vessel. This solution can be diluted to any desired degree with water, or may be used as is for the impregnation of paper, glass fabric, cotton cloth and other commonly used filler materials for laminates.

Laminates produced from paper, glass, cloth or other fabrics with the use of this resin have a very rapid cure and an excellent surface appearance. The following typical example of the use of this resin is given for the purposes of illustration:

Example III

Eight ounce cotton duck is passed through an undiluted bath of the product of Example I, squeezed free of excess resin by passing between suitably placed rollers, and subsequently dried to a volatile content of approximately 7% by passing through a steam heated drying tower. The resulting impregnated material is cut into sheets of suitable size, as for example, four feet by six feet, and stacked in layers sufficient to obtain the desired thickness and subsequently subjected to heat and pressure in the order of two hundred pounds (200) per square inch pressure and 300° F. until the resin has flowed and bonded the layers of fabric together and has completed its cure. The time required for complete drying varies with the thickness of the laminated article and may be from about ten minutes for a section one-eighth inch thick up to about one hour for a section one inch thick. The resulting product is a dense, strong, laminated article, which is resistant to moisture and resistant to attack by acids, heat, and organic solvents. A similar procedure of manufacture is followed for the production of laminates made from paper, glass fabrics, and other materials.

While the above typical examples are given, I do not wish to be limited to the exact conditions set forth above. In Example I the proportions of the reactants may be used and varied as stated in United States Patent No. 2,394,000.

In Example II the quantity of formaldehyde solution used may be varied from about 50 to 150 parts by weight, based on the product of Example I. The quantity of sodium hydroxide may vary from about 8 to 12 parts. The quantity of water used in the initial solution of Example II may be varied from at least about 20 parts upward to any amount desired. The time of reaction must be held to the exact time required to bring the solution to boiling. The quantity of water and alcohol employed to stop the reaction may be varied, as will be appreciated.

In Example III, the strength of the solution used for impregnation may be varied at the will of the operator, as it is necessary to achieve the exact amount of resin pick-up desired in the final article. The method of impregnation may be any of those commonly known to the art.

In Example II the heating of the initial resin with an aqueous solution of sodium hydroxide is usually at a temperature between 180° F. and 200° F., preferably 200° F., for about 15 minutes. The boiling point of the solution with formaldehyde is about 215° F.

Various modifications of this invention, such as the use of furfural and other aldehydes in place of formaldehyde, and the use of other alkalies or combinations of alkalies will be apparent to those skilled in the art, without departing from the merits thereof, and it is, therefore, desired to be limited only by the scope of the appended claim.

I claim:

A water-soluble, heat-hardening synthetic resin which is a mixed reaction product of a phenol with aldehydes and ketones made by the steps of liberating aldehydes and ketones from ligno-cellulosic material by acid-hydrolysis in the presence of live steam under pressure and simultaneously reacting a phenol with said liberated aldehydes and ketones to form a water-insoluble, non-heat-hardening resin, washing and drying the resin, heating the resin in an aqueous solution of sodium hydroxide and with agitation until the resin is melted and dissolved, adding formaldehyde to this solution and heating until the solution boils, and immediately adding an aqueous diluent to stop the reaction and form a solution of a water-soluble, heat-hardenable resin.

THOMAS ROBERT McELHINNEY.

REFERENCES CITED

The following references are of record in the file of this patent:

UNITED STATES PATENTS

| Number | Name | Date |
|---|---|---|
| 2,394,000 | McElhinney | Feb. 5, 1946 |
| 2,400,718 | Siegel | May 21, 1946 |
| 2,473,145 | Hesselbart | June 14, 1949 |